(12) United States Patent
Sugimori

(10) Patent No.: US 10,017,146 B2
(45) Date of Patent: Jul. 10, 2018

(54) CURTAIN AIRBAG AND CURTAIN AIRBAG DEVICE

(71) Applicant: JOYSON SAFETY SYSTEMS JAPAN K.K., Tokyo (JP)

(72) Inventor: Sakae Sugimori, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 171 days.

(21) Appl. No.: 15/029,401

(22) PCT Filed: Aug. 5, 2014

(86) PCT No.: PCT/JP2014/070580
§ 371 (c)(1),
(2) Date: Apr. 14, 2016

(87) PCT Pub. No.: WO2015/059977
PCT Pub. Date: Apr. 30, 2015

(65) Prior Publication Data
US 2016/0221527 A1    Aug. 4, 2016

(30) Foreign Application Priority Data
Oct. 22, 2013  (JP) ................................ 2013-219277

(51) Int. Cl.
*B60R 21/232*  (2011.01)
*B60R 21/213*  (2011.01)
(Continued)

(52) U.S. Cl.
CPC .......... *B60R 21/232* (2013.01); *B60R 21/213* (2013.01); *B60R 21/239* (2013.01);
(Continued)

(58) Field of Classification Search
CPC ... B60R 21/232; B60R 21/213; B60R 21/239; B60R 21/26; B60R 21/23138;
(Continued)

(56) References Cited

U.S. PATENT DOCUMENTS 5,730,464 A *  3/1998  Hill ................... B60R 21/23138
                                               280/730.2
6,237,937 B1    5/2001  Kokeguchi et al.
(Continued)

FOREIGN PATENT DOCUMENTS

EP    0771694 A2 *  5/1997  ........... B60R 21/233
EP    2 292 477 A1    3/2011
(Continued)

OTHER PUBLICATIONS

International Search Report (with English-language translation) and Written Opinion for PCT/JP2014/070580 dated Oct. 28, 2014.

*Primary Examiner* — Karen Beck
(74) *Attorney, Agent, or Firm* — Foley & Lardner LLP

(57) ABSTRACT

A curtain airbag and a curtain airbag device that reduce the energy transferred to an occupant even though an internal inflation pressure in a curtain airbag body is low are provided. A tie panel 3 is disposed on a curtain airbag body 2 on a side opposite a vehicle interior. An upper portion and a lower portion of the tie panel 3 are connected to the curtain airbag body 2 by sewing. In an area overlapped with the tie panel 3, the panels 5 and 6 of the curtain airbag body 2 are connected to each other by sewing with linearly connected portions 32 to 35, which extend radially in four directions, so as to form four inflation chambers 8 to 11. The curtain airbag body 2 and the tie panel 3 define a space S therebetween when the curtain airbag body 2 is inflated. The space (Continued)

S is in a pyramidal shape in which a portion around an intersection M of the connected portions 32 to 35 protrudes the most.

9 Claims, 11 Drawing Sheets

(51) Int. Cl.
    *B60R 21/231*     (2011.01)
    *B60R 21/239*     (2006.01)
    *B60R 21/26*     (2011.01)
    *B60R 21/233*     (2006.01)
    *B60R 21/2338*     (2011.01)
    *B60R 21/00*     (2006.01)

(52) U.S. Cl.
    CPC ........ *B60R 21/23138* (2013.01); *B60R 21/26* (2013.01); *B60R 21/233* (2013.01); *B60R 2021/0006* (2013.01); *B60R 2021/0032* (2013.01); *B60R 2021/23161* (2013.01); *B60R 2021/23386* (2013.01)

(58) Field of Classification Search
    CPC .......... B60R 21/233; B60R 2021/0006; B60R 2021/0032; B60R 2021/23386
    See application file for complete search history.

(56) References Cited

U.S. PATENT DOCUMENTS

| | | | |
|---|---|---|---|
| 7,396,041 B2* | 7/2008 | Noguchi | B60R 21/232 280/730.2 |
| 8,740,247 B1* | 6/2014 | Jovicevic | B60R 21/232 280/730.2 |
| 9,114,776 B2* | 8/2015 | Thomas | B60R 21/2338 |
| 9,487,179 B2* | 11/2016 | Takedomi | B60R 21/2334 |
| 9,771,046 B2* | 9/2017 | Lee | B60R 21/233 |
| 2003/0168836 A1 | 9/2003 | Sato et al. | |
| 2005/0206138 A1 | 9/2005 | Breuninger et al. | |
| 2005/0206147 A1 | 9/2005 | Sievers | |
| 2006/0157958 A1 | 7/2006 | Heudorfer et al. | |
| 2007/0170707 A1 | 7/2007 | Sato et al. | |
| 2010/0171293 A1 | 7/2010 | Yamamoto et al. | |
| 2010/0276915 A1 | 11/2010 | Breuninger et al. | |
| 2010/0276916 A1 | 11/2010 | Breuninger et al. | |
| 2013/0020791 A1 | 1/2013 | Yamamoto et al. | |
| 2016/0031404 A1* | 2/2016 | Takedomi | B60R 21/2334 280/729 |
| 2016/0059816 A1* | 3/2016 | Je | B60R 21/232 280/730.2 |
| 2016/0221527 A1* | 8/2016 | Sugimori | B60R 21/232 |
| 2017/0182964 A1* | 6/2017 | Konaka | B60R 21/213 |

FOREIGN PATENT DOCUMENTS

| | | |
|---|---|---|
| EP | 1 937 517 B1 | 8/2011 |
| JP | 2000-006747 A | 1/2000 |
| JP | 2001-287612 A | 10/2001 |
| JP | 2004-058860 A | 2/2004 |
| JP | 2006-137413 A | 6/2006 |
| JP | 2006-142964 A | 6/2006 |
| JP | 2007-106376 A | 4/2007 |
| JP | 2011-051526 A | 3/2011 |
| JP | 2012-071718 A | 4/2012 |
| WO | WO-2009/008350 A1 | 1/2009 |

* cited by examiner

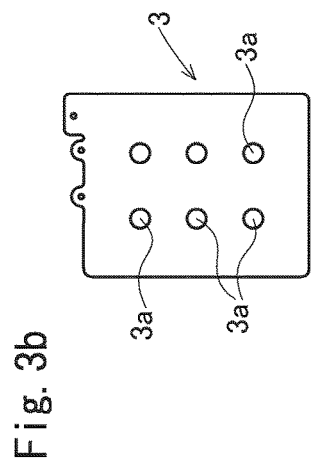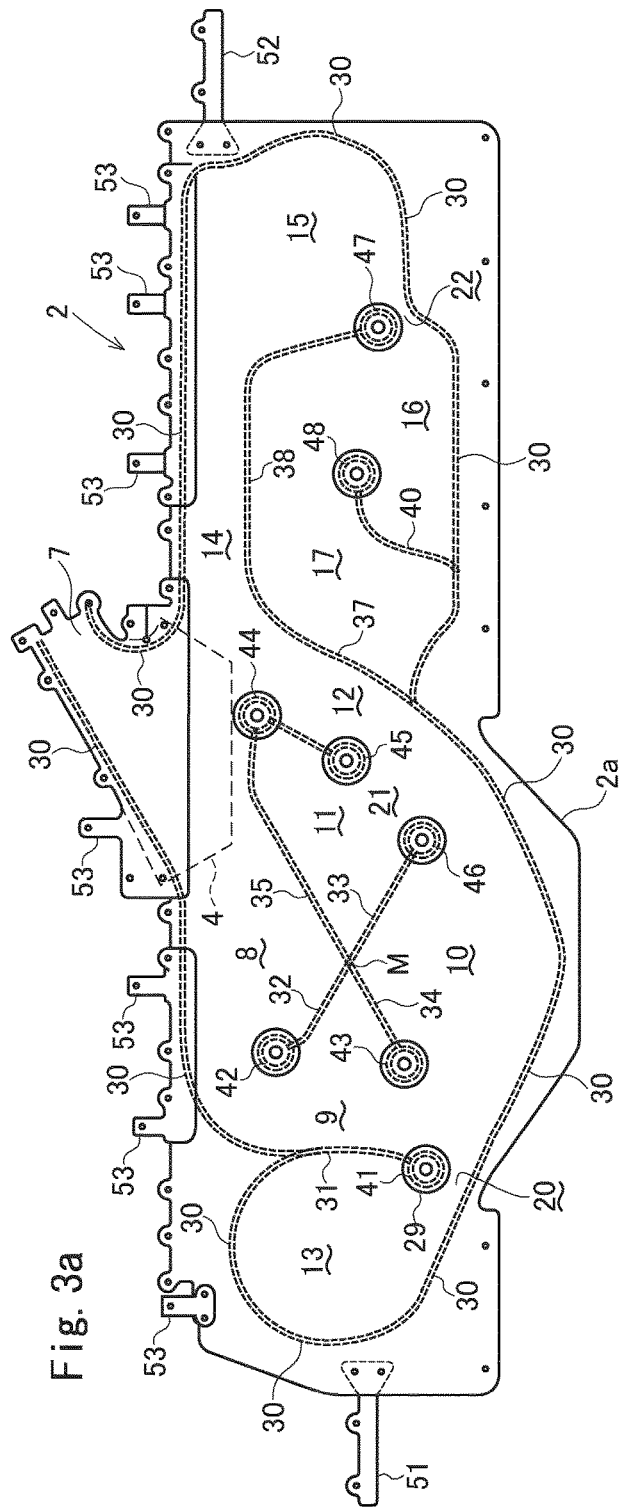

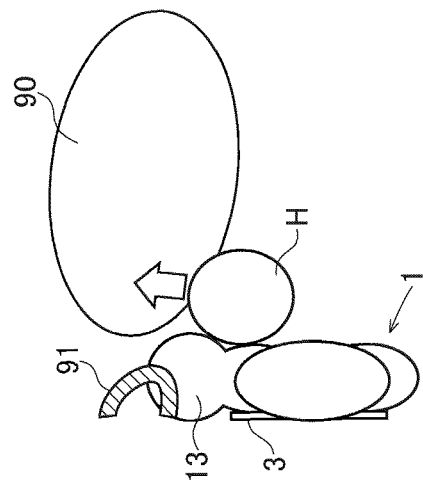
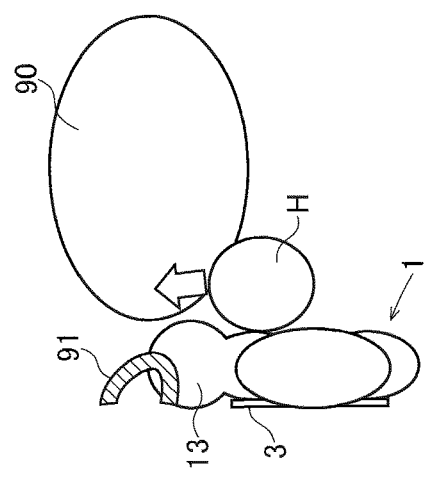
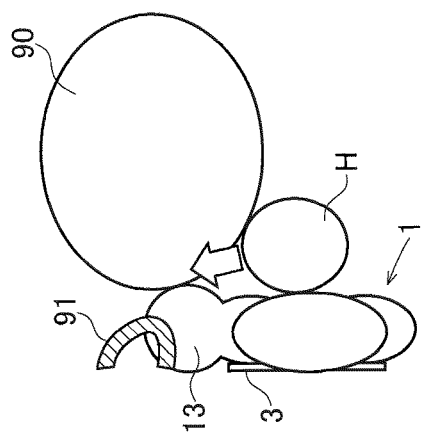

CURTAIN AIRBAG AND CURTAIN AIRBAG DEVICE

TECHNICAL FIELD

The present invention relates to a curtain airbag (curtain-like airbag) configured to deploy downward along a side surface of a vehicle interior, and more particularly to a curtain airbag including a curtain airbag body to be inflated with gas from an inflator, and a tie panel disposed on an intermediate portion of the curtain airbag body in a front-rear direction on a side opposite the vehicle interior. The present invention also relates to a curtain airbag device including the curtain airbag.

BACKGROUND ART

In an automobile equipped with a curtain airbag device, a curtain airbag is inflated downward along a side surface (a door or pillar, for example) of a vehicle interior upon a side impact or roll-over of a vehicle.

Patent Literature 1 (Japanese Unexamined Patent Application Publication No. 2006-137413) discloses a curtain airbag including a curtain airbag body configured to be inflated with gas from an inflator, and a tie panel disposed on an intermediate portion of the curtain airbag body in the front-rear direction of the vehicle on a side opposite the vehicle interior. Upper and lower portions of the tie panel are sewn to upper and lower portions of the curtain airbag body, respectively. The length between an upper sewn portion and a lower sewn portion of the tie panel is shorter than the length between the upper sewn portion and the lower sewn portion of the curtain airbag body. Thus, as described in [0033] or as illustrated in FIG. 7(c) of Patent Literature 1, the inflated curtain airbag body has a <-like shape or L-like shape when viewed from the side. A triangular prismatic space, which has a triangle shape when viewed from a front or rear side, is defined between the curtain airbag body and the tie panel.

When the curtain airbag body receives the impact of an occupant in the event of a vehicle emergency, the gas in the curtain airbag body flows out and the curtain airbag body deforms such that the size of the triangular prism space decreases. Thus, the curtain airbag absorbs the energy to be transferred to the occupant.

CITATION LIST

Patent Literature

PTL 1: Japanese Unexamined Patent Application Publication No. 2006-137413

SUMMARY OF INVENTION

Technical Problem

In the curtain airbag disclosed in Patent Literature 1, the internal inflation pressure in the curtain airbag body needs to be increased in order to absorb a higher energy force. This requires an inflator having a large capacity. It is an object of the present invention to provide a curtain airbag that reduces the energy transferred to an occupant even though the internal inflation pressure in the curtain airbag body is small and a curtain airbag device including the curtain airbag.

Solution to Problem

The present invention provides a curtain airbag configured to deploy downward along a side surface of a vehicle interior, including a curtain airbag body configured to be inflated with gas from an inflator, and a tie panel disposed on a side surface of an intermediate portion of the curtain airbag body in a front-rear direction of a vehicle (hereinafter, referred to as a tie panel installation portion) on a side opposite the vehicle interior, the tie panel being connected to an upper portion and a lower portion of the curtain airbag body with an upper connection means and a lower connection means, the curtain airbag body including a first panel on a vehicle interior side, a second panel on a side opposite the vehicle interior side, and a connected portion connecting the first panel and the second panel to each other, the connected portion including: a peripheral connected portion extending along peripheral portions of the first panel and the second panel, and an inner connected portion positioned inward from the peripheral connected portion, a length between the upper connection means and the lower connection means in the tie panel being shorter than a length between the upper connection means and the lower connection means in the curtain airbag body, wherein the inner connected portion includes radial connected portions extending radially in three directions or in more than three directions from a middle or from a position near the middle of the tie panel installation portion, and the radial connected portions extending in the three directions extend at least obliquely upward or obliquely downward from the middle or from the position near the middle of the tie panel installation portion.

In the present invention, it is preferable that the radial connected portions extending from the middle or from the position near the middle of the tie panel installation portion include a first radial connected portion extending forward and upward, a second radial connected portion extending forward and downward, a third radial connected portion extending rearward and downward, and a fourth radial connected portion extending rearward and upward.

In such a case, it is preferable that the first radial connected portion and the third radial connected portion extend in opposite directions that the second radial connected portion and the fourth radial connected portion extend in opposite directions.

The second connected portion may include a circular connected portion extending circularly at the position near the middle of the tie panel installation portion, and the first to fourth radial connected portions may extend radially from the circular connected portion.

It is preferable that a space between the radial connected portions in the curtain airbag body be configured to be inflated with gas from an inflator.

It is preferable that a length in a vertical direction of the curtain airbag body at the tie panel installation portion be longer than a length in the vertical direction of the curtain airbag body at sections on front and rear sides of the tie panel installation portion.

It is preferable that the tie panel be positioned next to at least one of a front seat and a rear seat of an automobile.

A curtain airbag device includes the curtain airbag and an inflator configured to inflate the curtain airbag.

Advantageous Effects of Invention

In the curtain airbag and the curtain airbag device of the present invention, when the curtain airbag body is inflated with gas from the inflator, a portion having radial connected portions protrudes toward the vehicle interior such that a space is defined between the protruded portion and the tie panel. When the occupant is restrained by such a portion, the capacity of the inflated curtain airbag decreases and the above-described space decreases, and thus the impact of the occupant is absorbed. In this case, the force applied by the occupant to the curtain airbag body is dispersed in three or more directions, because the radial connected portions extend in at least three directions. Thus, the occupant is restrained even though the internal inflation pressure in the curtain airbag is small, thereby enabling an inflator having a low output power to be employed.

The configuration in which the radial connected portions extend in four directions such as up, down, forward, and rearward enables the curtain airbag having a small internal inflation pressure to restrain the occupant. In this configuration, spaces between the radial connected portions are inflated with gas from the inflator, enabling absorption of a higher impact force.

BRIEF DESCRIPTION OF DRAWINGS

FIG. 3a is a front view illustrating a curtain airbag body illustrated in FIG. 1, and FIG. 3b is a front view of a tie panel on the curtain airbag body.

FIGS. 15a, 15b, and 15c are schematic plan views illustrating a vehicle interior in which the curtain airbag is installed.

DESCRIPTION OF EMBODIMENTS

Figure 1:
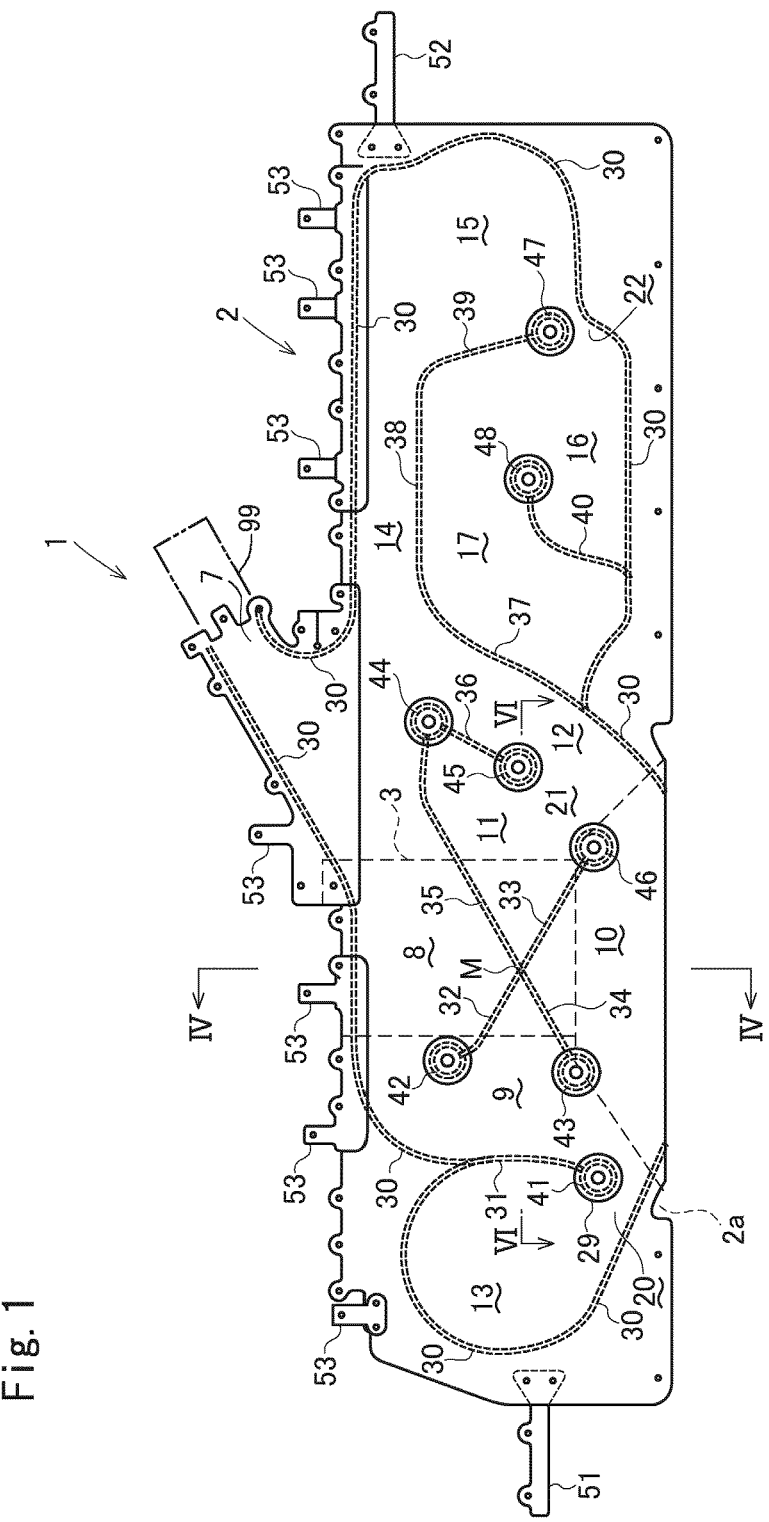
FIG. 1 is a front view illustrating a curtain airbag of a present embodiment which is viewed from a vehicle interior.
Figure 2:
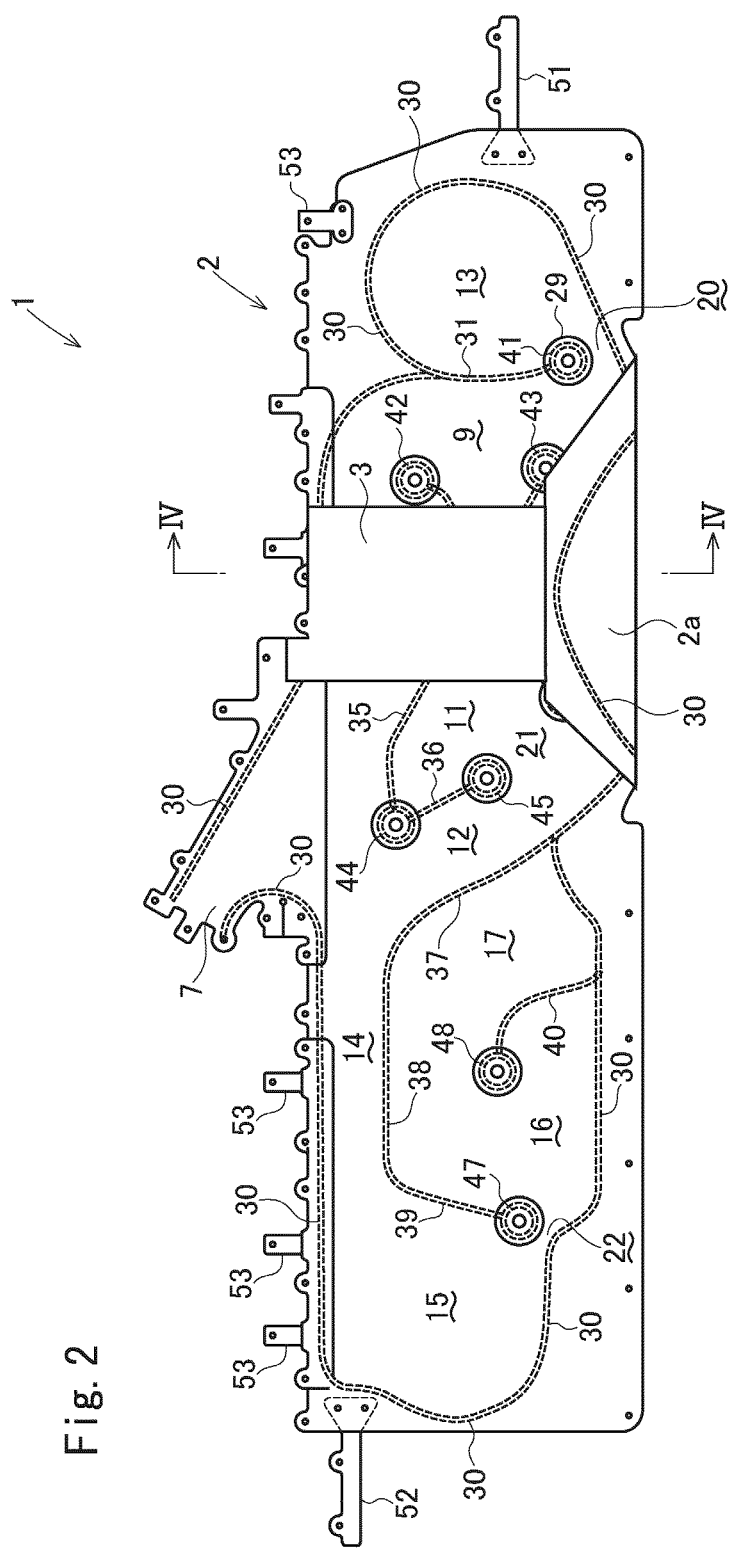
FIG. 2 is a rear view of the curtain airbag illustrated in FIG. 1.

Hereinafter, a curtain airbag 1 according to an embodiment of the present invention is described with reference to FIG. 1 to FIG. 8. A front-rear direction and a vertical direction in the following description correspond to front-rear directions of a vehicle and vertical directions of the vehicle, respectively, in which the curtain airbag 1 is installed. In FIG. 1 to FIG. 3, a curtain airbag or a curtain airbag body, which is to be folded, opens flat.

The curtain airbag 1 includes a curtain airbag body 2, a tie panel 3 disposed on the curtain airbag body 2 on a side opposite a vehicle interior, and a duct panel 4 (FIG. 3a) disposed in the curtain airbag body 2. The duct panel 4 divides the gas from an inflator 99, which is inserted into an inflator inlet 7, so as to flow forward and rearward. The tie panel 3 is positioned next to a front seat of the automobile (driver's seat or front passenger seat).

In this embodiment, as illustrated in FIG. 4 to FIG. 7, the curtain airbag body 2 includes a panel 5 (first panel) on a vehicle interior side and a panel 6 (second panel) on a side opposite the vehicle interior side. The overlapped panels 5 and 6 are connected through linearly connected portions 30 to 40 and circular connected portions 41 to 48 such that an inflator inlet 7, inflation chambers 8 to 17, and gas passages 20 to 22 are defined between the panels 5 and 6.

The linearly connected portions 30 to 40 and the circular connected portions 41 to 48 are formed by strong connecting means (such as sewing with a strong thread, bonding with an adhesive having a high adhesive force, or welding) that allows air-tight connection between the panel 5 and the panel 6 and does not allow separation between the panels 5 and 6 when an internal pressure in the curtain airbag body 2 increases to a design upper pressure limit. In a case in which the panels 5 and 6 are connected by sewing, a sealing adhesive (sealant) may be applied to portions of the panels to be sewn, or the panels 5 and 6 may be sewn without a sealant. Some of the linearly connected portion (linearly connected portions 32 to 35, for example) may be woven together (interwoven) with the panels 5 and 6.

The linearly connected portion 30 is a peripheral connected portion substantially encompassing the curtain airbag body 2. The linearly connected portion 30 is disconnected at a midway position in the front-rear direction on an upper edge of the curtain airbag body 2. The disconnected portion provides the inflator inlet 7.

Figure 4:
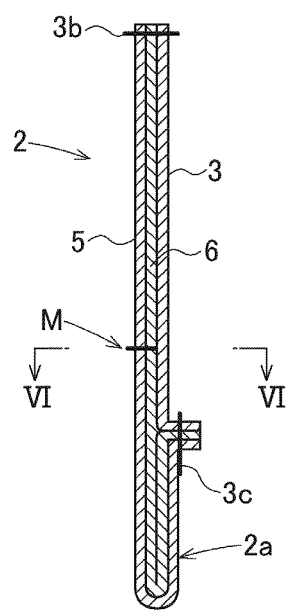
FIG. 4 is a cross-sectional view taken along a line IV-IV in FIGS. 1 and 2.
Figure 5:
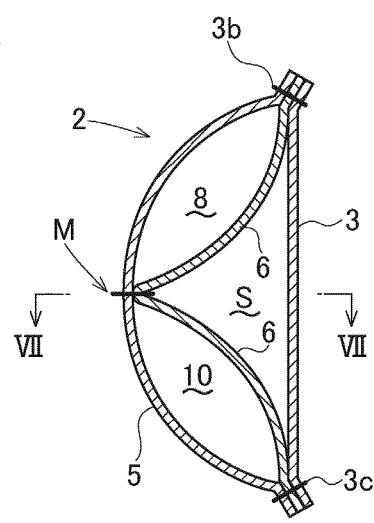
FIG. 5 is a cross-sectional view of the curtain airbag in an inflated state taken along the same line as in FIG. 4.
Figure 6:
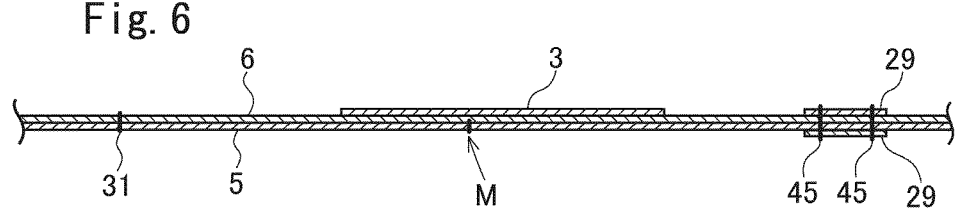
FIG. 6 is a cross-sectional view taken along a line VI-VI in FIG. 1.

The tie panel 3 is positioned next to the front seat of the automobile. As illustrated in FIG. 4 and FIG. 5, an upper portion of the tie panel 3 is sewn to the panels 5 and 6 with an upper connection means 3b extending along an upper portion of the curtain airbag body 2. A lower portion of the tie panel 3 is sewn to the panels 5 and 6 with a lower connection means 3c extending along a lower portion of the curtain airbag body 2. The upper connection means 3b may be a portion of the linearly connected portion 30 on the upper side or may be another sewn portion. The lower connection means 3c may be a portion of the linearly connected portion 30 on a lower side or may be another sewn portion. The tie panel 3 has a plurality of ventilation holes 3a (FIG. 3b).

As illustrated in FIG. 3a, the curtain airbag body 2 includes an extension 2a, which extends downward, at a position below an installation area of the tie panel 3 (tie panel installation portion). The extension 2a makes the length in the vertical direction of the curtain airbag body 2 longer at the tie panel installation portion than at sections on front and rear sides of the tie panel installation portion. As illustrated in FIG. 4, the extension 2a is bent upward toward the side opposite the vehicle interior and sewn to the lower portion of the tie panel 3 with the lower connection means 3c.

The length between the upper connection means 3b and the lower connection means 3c of the tie panel 3, which opens flat, is shorter than the length between the upper connection means 3b and the lower connection means 3c of the curtain airbag body 2 to which the tie panel 3 is to be attached.

At a front section of the curtain airbag body 2, a portion of the linearly connected portion 30 on the upper side extends in a V shape. A linearly connected portion 31 extends downward from the lower end of the V shape to a circular connected portion 41. A circular patch cloth 29 is disposed at a position where the circular connected portion 41 is disposed. The panels 5 and 6 and the patch cloths 29 are sewn together with the circular connected portion 41. Patch cloths are disposed for each of circular connected portions 42 to 48, which are described later.

An inflation chamber 13 is provided between the circular connected portion 41 and a portion of the linearly connected portion 30 on the front side. A gas passage 20 is provided between the circular connected portion 41 and a portion of the linearly connected portion 30 on the lower side. Two circular connected portions 42 and 43 are positioned rearward of the linearly connected portion 31 and slightly forward of the tie panel 3. The circular connected portion 42 is positioned above the circular connected portion 43. The circular connected portion 43 and a lower side of the tie panel 3 are positioned at substantially the same height.

Three circular connected portions 44, 45, and 46 are positioned slightly rearward of the tie panel 3. The uppermost circular connected portion 44 is positioned below the inflator inlet 7. The lowermost circular connected portion 46 is positioned near a rear end of the lower side of the tie panel 3. The circular connected portion 45 is positioned near a middle point between the circular connected portions 44 and 46. A linearly connected portion 36 extends from the circular connected portion 44 to the circular connected portion 45. A gas passage 21 is provided between the circular connected portions 45 and 46.

The linearly connected portions 32 and 33 extend linearly from the circular connected portion 42 to the circular connected portion 46. The linearly connected portions 34 and 35 extend linearly from the circular connected portion 43 to the circular connected portion 44.

The linearly connected portions 32 and 33 and the linearly connected portions 34 and 35 cross at an intersection M. The intersection M is positioned slightly below a center point (point of the center in the vertical direction and the left-right direction) of the tie panel 3. In this embodiment, the intersection M is preferably positioned near the middle of the tie panel 3 in the front-rear direction, and above the lower side of the tie panel 3 by 0 to 250 mm, particularly 0 to 150 mm.

The linearly connected portions 32 to 35 cross at the intersection M so as to form an X-like shape. The linearly connected portion 32 extends forward of and upward from the intersection M. The linearly connected portion 33 extends rearward of and downward from the intersection M. The linearly connected portion 34 extends forward of and downward from the intersection M. The linearly connected portion 35 extends rearward of and upward from the intersection M. The intersection M is positioned next to the front seat of the automobile. The linearly connected portion 35 has a substantially horizontal rear end portion.

In the curtain airbag body 2, an inflation chamber 8 is provided between the linearly connected portions 32 and 35. An inflation chamber 9 is provided between the linearly connected portions 32 and 34. An inflation chamber 10 is provided between the linearly connected portions 34 and 33. An inflation chamber 11 is provided between the linearly connected portions 33 and 35.

In the curtain airbag body 2 in a non-inflated state, a horizontal distance between the intersection M and the linearly connected portion 31 is preferably about 150 to 450 mm, particularly about 180 to 380 mm. The circular connected portion 45 is preferably positioned rearward of the intersection M. A distance between the intersection M and the circular connected portion 45 is preferably about 150 to 450 mm, particularly about 180 to 380 mm.

The circular connected portion 44 is positioned above and slightly rearward of the circular connected portion 45. Thus, the linearly connected portion 36 extends obliquely so as to gradually increase in height toward the rear. A linearly connected portion 37 extending substantially parallel to the linearly connected portion 36 is disposed rearward of the linearly connected portion 36. The lower end of the linearly connected portion 37 joins a portion of the linearly connected portion 30 on the lower side of the curtain airbag body 2. The upper end of the linearly connected portion 37 joins the linearly connected portion 38, which extends substantially horizontally. The linearly connected portion 38 extends rearward and substantially parallel to the portion of the linearly connected portion 30 on the upper side of the curtain airbag body 2.

The rear end of the linearly connected portion 38 joins a linearly connected portion 39, which extends obliquely so as to gradually decrease in height toward the rear. The lower end of the linearly connected portion 39 joins the circular connected portion 47. A gas passage 22 is provided between the circular connected portion 47 and a portion of the linearly connected portion 30 on the lower side of the curtain airbag body 2.

A space between the linearly connected portion 37 and the linearly connected portion 36 is an inflation chamber 12. A space between the linearly connected portion 38 and the portion of the linearly connected portion 30 on the upper side is an inflation chamber 14. A space between the linearly connected portion 39 and a portion of the linearly connected portion 30 on the rear side is an inflation chamber 15.

A circular connected portion 48 is disposed below a substantially middle of the linearly connected portion 38 in the front-rear direction. A linearly connected portion 40 extends from the circular connected portion 48 to the portion of the linearly connected portion 30 on the lower side. The linearly connected portion 40 extends obliquely so as to gradually increase in height toward the rear. An inflation chamber 16 is provided between the linearly connected portion 40 and the linearly connected portion 39. A space defined by the linearly connected portion 40 and the linearly connected portions 37 and 38 is an inflation chamber 17.

Tethers 51 and 52 for connecting the curtain airbag body 2 to an A pillar and a C pillar of a chassis extend from front and rear ends of the curtain airbag body 2. In addition, attachment pieces 53 for connecting the curtain airbag body 2 to a roof side rail of the chassis extend from the upper end of the curtain airbag body 2.

The inflator (gas generator) 99 is inserted into the inflator inlet 7 of the curtain airbag 1, and a fastener such as a band is fastened to an outer circumferential surface of the inflator inlet 7. The inflator 99 is attached in this way. The inflator is fixed to the roof side rail of the automobile.

Although not illustrated, the curtain airbag 1 is folded so as to be long in the front-rear direction after the extension 2a of the curtain airbag body 2 is bent upward toward the side opposite the vehicle interior as illustrated in FIG. 2 and FIG. 4. The curtain airbag 1 in such a state is mounted along a roof side portion of the automobile (border between a ceiling surface and a side surface of the vehicle interior). The tethers 51 and 52 are connected to the A pillar and the C pillar. The attachment pieces 53 are fixed to the roof side rail with fixtures such as bolts or rivets. The curtain airbag 1 in the folded state is covered by a roof garnish.

The curtain airbag 1 does not include a plurality of vertical cells, and thus a volume (package volume) of the curtain airbag 1 in the folded state is relatively small.

Upon collision or roll-over of the automobile equipped with the curtain airbag device having the above-described configuration, the inflator 99 is activated such that gas is supplied from the inflator 99 into the curtain airbag body 2, and thus the curtain airbag body 2 starts to be inflated. The curtain airbag 1 pushes open the roof garnish and deploys downward along the side surface of the vehicle interior.

At this time, the gas supplied from the inflator into the curtain airbag body 2 is divided by the duct panel 4 (FIG. 3a) so as to flow forward and rearward. The gas divided so as to flow forward sequentially inflates the inflation chambers 8, 9, 10, 12, and 11. The gas flowing from the inflation chamber 9 to the inflation chamber 10 partly flows to the inflation chamber 13 through the gas passage 20 to inflate the inflation chamber 13.

Since the tie panel 3 is shorter in the vertical direction than the tie panel installation portion (in a state in which the tie panel 3 is not connected thereto as illustrated in FIG. 3a) of the curtain airbag body 2, when the inflation chambers 8 to 11 are inflated, the curtain airbag body 2 is inflated such that a portion around the intersection M protrudes from the tie panel 3 toward the vehicle interior as illustrated in FIG. 5. The intersection M is preferably positioned next to a head of an occupant on the front seat of the automobile (driver or occupant on a front passenger seat).

The gas divided by the duct panel 4 so as to flow rearward along the upper side of the curtain airbag body 2 inflates the inflation chamber 14. Then, the gas inflates the rearmost inflation chamber 15 and passes through the gas passage 22 to sequentially inflate the inflation chambers 16 and 17.

Figure 7:
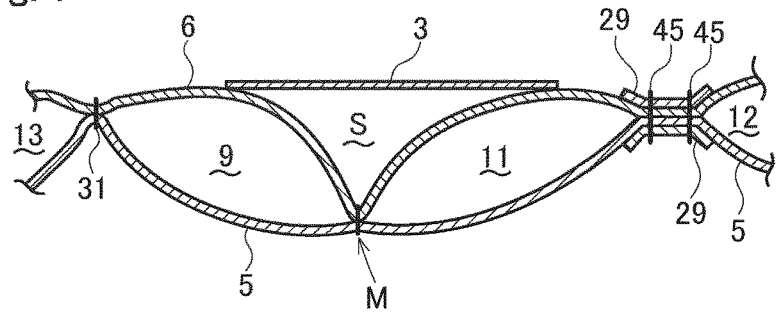
FIG. 7 is a cross-sectional view of the curtain airbag in an inflated state taken along the same line as in FIG. 6.

In the curtain airbag body 2 in the inflated state, as illustrated in FIG. 5 and FIG. 7, four inflation chambers 8 to 11 extend upward, forward, downward, and rearward from the intersection M at the tie panel installation portion. A space S in a shape of a substantially four-sided pyramid is defined between the intersection M and the tie panel 3. When the portion around the intersection M receives the impact of the occupant, the inflation chambers 8 to 11 decrease in the capacity and the curtain airbag body 2 deforms such that the space S decreases in the thickness (distance between the intersection M and the tie panel 3). Thus, the curtain airbag device absorbs a kinetic energy of the occupant.

Figure 8:
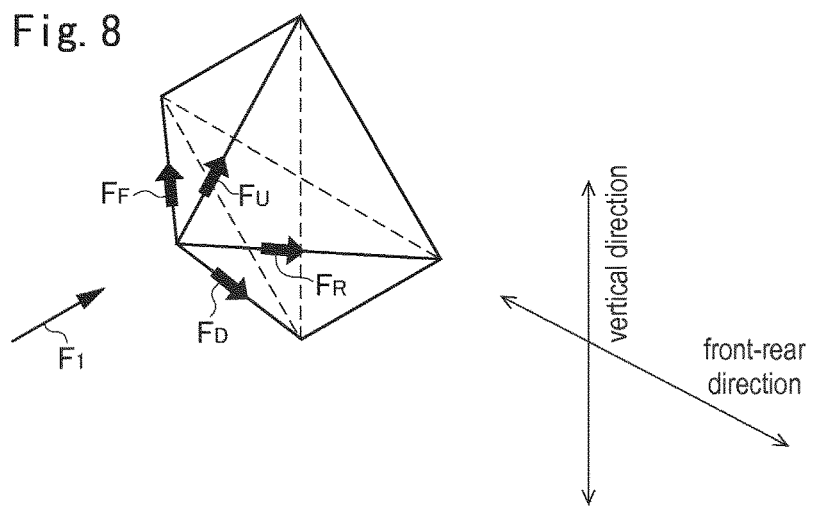
FIG. 8 is a schematic perspective view illustrating how input force to the curtain airbag of the present embodiment is dispersed.

In this embodiment, as illustrated in FIG. 8, a force $F_1$, which is applied to the curtain airbag 1 when the occupant comes in contact with the portion around the intersection M, is countered by the inflation chambers 8 to 11 extending in four directions of front, rear, up, and down directions. Specifically, the force $F_1$ is separated into an upward component force $F_U$, a forward component force $F_F$, a downward component force $F_D$, and a rearward component force $F_R$. The component forces $F_U$, $F_F$, $F_D$, and $F_R$ are countered by the inflation chambers 8 to 11. Thus, the component forces $F_U$, $F_F$, $F_D$, and $F_R$ are countered and the energy of the occupant is absorbed even though the internal pressure in the curtain airbag body 2 is low. This enables employment of the inflator having a small capacity.

Figure 9:
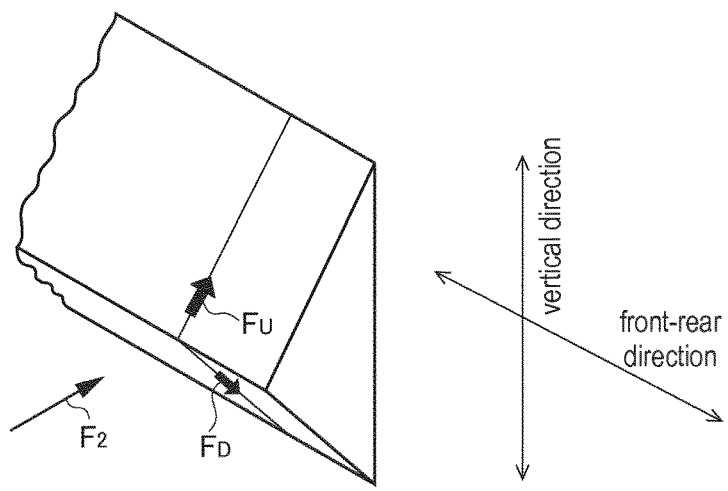
FIG. 9 is a schematic perspective view illustrating how input force to a conventional curtain airbag is dispersed.

Compared to the above, in the curtain airbag that inflates in a triangular prism shape, which is triangle when viewed from the side as illustrated in FIG. 7(c) of Patent Literature 1, a force $F_2$ applied to the curtain airbag by the occupant is separated into an upward component force $F_U$ and a downward component force $F_D$ as illustrated in FIG. 9. Such component forces $F_U$ and $F_D$ are larger than the component forces $F_U$ and $F_D$ in FIG. 8. Thus, the internal pressure in the curtain airbag needs to be higher than that in FIG. 8 so as to counter the large component forces $F_U$ and $F_D$. This requires a high-power inflator.

Figure 10:
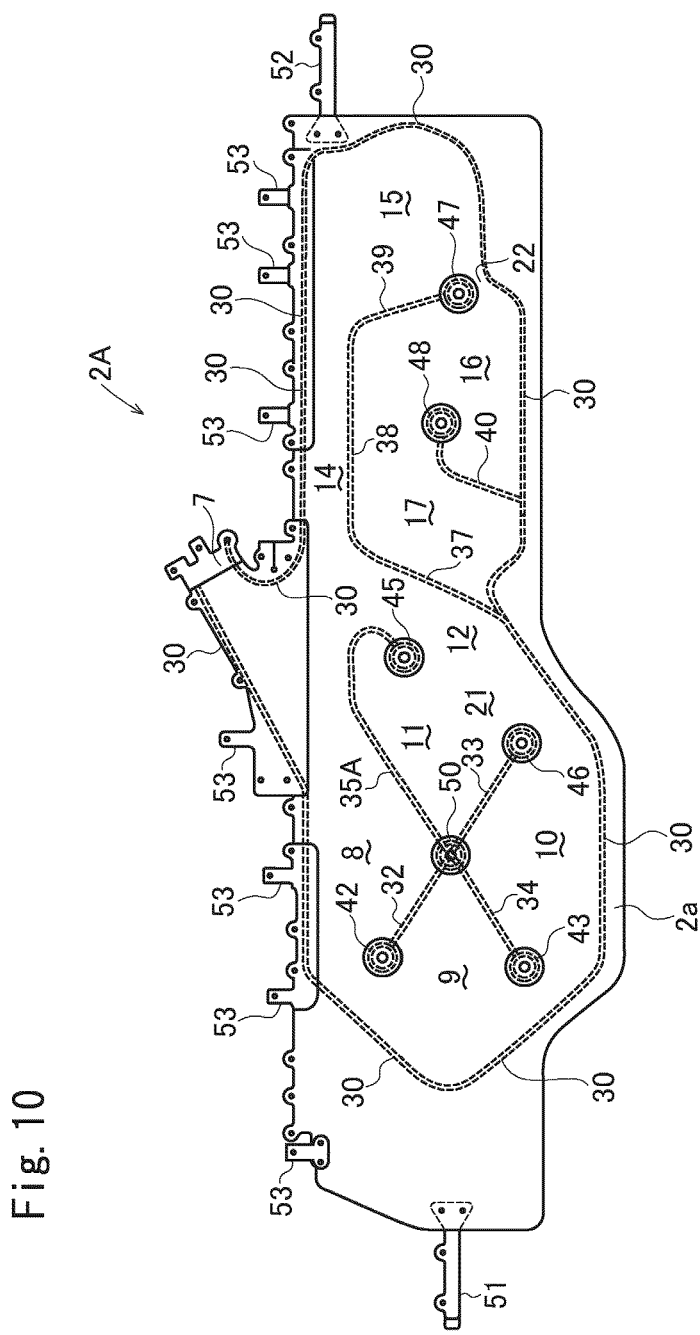
FIG. 10 is a front view illustrating a curtain airbag body of another embodiment.

In the above-described embodiment, the curtain airbag body 2 includes the inflation chamber 13 at the foremost section. However, as a curtain airbag body 2A illustrated in FIG. 10, the inflation chamber 13 may be eliminated. In addition, as illustrated in FIG. 10, a circular connected portion 50 may be disposed on the intersection M to increase connection strength between the panels 5 and 6 at the portion around the intersection M. The linearly connected portions 32, 33, 34 and 35A extend radially from the circular connected portion 50.

In FIG. 10, the circular connected portion 44 is eliminated and a position of the circular connected portion 45 is slightly higher than that in the curtain airbag body 2. In the same manner as the linearly connected portion 35, the linearly connected portion 35A extends rearward of and upward from the circular connected portion 50 and has a rear portion extending substantially horizontally at a position above the circular connected portion 45. The linearly connected portion 35A curves downward in a J-like shape at a position rearward of the circular connected portion 45 so as to join the circular connected portion 45.

Other configurations of the curtain airbag body 2A are identical to those of the curtain airbag body 2. The same reference numerals designate the same components.

An inflation operation in the curtain airbag body 2A is the same as that in the curtain airbag body 2 except that the curtain airbag body 2A does not include the inflation chamber 13. The curtain airbag including the curtain airbag body 2A has the same operational advantages as the curtain airbag 1.

The curtain airbag bodies 2 and 2A include the portion to be inflated in the pyramidal shape at the side of the front seat. Alternatively, as a curtain airbag body 2B illustrated in FIG. 11a and FIG. 11b, a portion to be inflated in the pyramidal shape may also be provided at a position adjacent to the rear seat of the vehicle.

Figure 11:
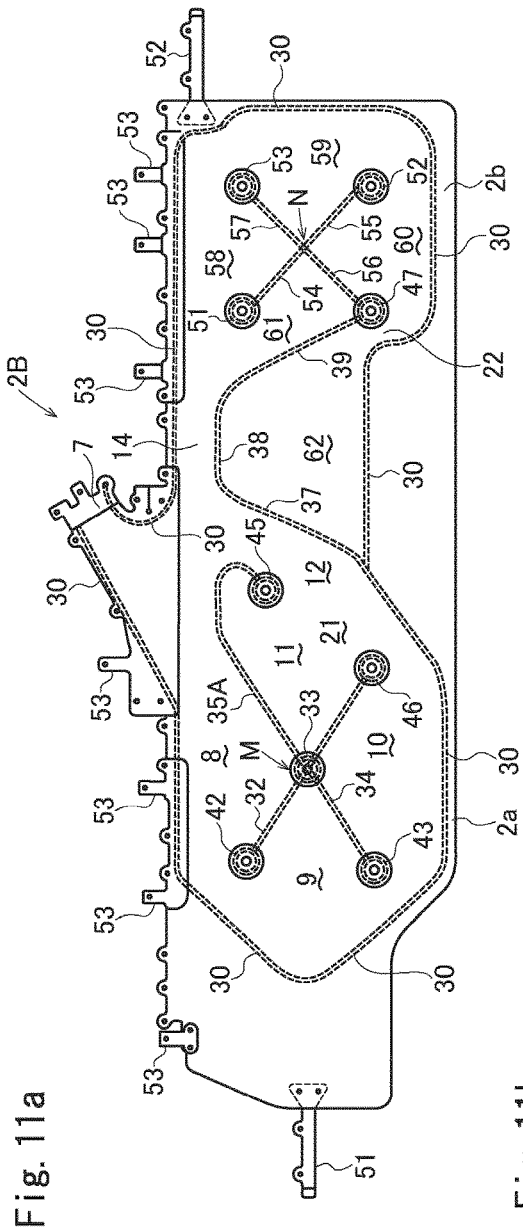
FIG. 11a is a front view illustrating a curtain airbag body of another embodiment.
FIG. 11b is a front view of a curtain airbag.

As illustrated in FIG. 11a, in the rear section of the curtain airbag body, the curtain airbag 2B includes a circular connected portion 51 positioned above the circular connected portion 47, a circular connected portion 52 positioned rearward of the circular connected portion 47, and a circular connected portion 53 positioned rearward of the circular connected portion 51 and above the circular connected portion 52. The circular connected portion 51 is away from the linearly connected portions 38 and 39.

Linearly connected portions 54 and 55 extend linearly from the circular connected portion 51 to the circular connected portion 52. Linearly connected portions 56 and 57 extend linearly from the circular connected portion 47 to the circular connected portion 53.

The linearly connected portions 54 and 55 and the linearly connected portions 56 and 57 cross at an intersection N. The intersection N is positioned slightly below the center point of a rear seat tie panel 3R (center point in the vertical direction and the left-right direction). In this embodiment, the intersection N is preferably positioned at a substantially middle in the front-rear direction of the tie panel 3R and at a position above the lower side of the tie panel 3R by 0 to 250 mm, particularly 0 to 150 mm. The tie panel 3R has ventilation holes.

The linearly connected portions 54 to 57 cross at the intersection N so as to form an X-like shape. The linearly connected portion 54 extends forward of and upward from the intersection N. The linearly connected portion 55 extends rearward of and downward from the intersection N. The linearly connected portion 56 extends forward of and downward from the intersection N. The linearly connected portion 57 extends rearward of and upward from the intersection N.

In the curtain airbag body 2B, an inflation chamber 58 is provided between the linearly connected portions 54 and 57, an inflation chamber 59 is provided between the linearly connected portions 57 and 55, an inflation chamber 60 is provided between the linearly connected portions 55 and 56, and an inflation chamber 61 is provided between the linearly connected portions 56 and 54.

In the curtain airbag body 2B in a non-inflated state, a horizontal distance between the intersection N and the linearly connected portion 39 is preferably about 150 to 450 mm, particularly about 180 to 380 mm. A distance between the intersection N and the portion of the linearly connected portion 30 on the rear side of the curtain airbag body 2 is preferably about 150 to 450 mm, particularly about 180 to 380 mm.

The curtain airbag body 2B includes an extension 2b, which extends downward, at a lower portion of the rear section. The lower portion of the tie panel 3R is connected to the lower side of the extension 2b by sewing, for example. The upper portion of the tie panel 3R is connected to the upper side of the curtain airbag body 2B by sewing, for example. The length between the upper portion and the lower portion of the tie panel 3R, which opens flat, is shorter than the length between the upper side of the curtain airbag body 2B, to which the tile panel 3R is to be attached, and the lower side of the extension 2b.

When the curtain airbag is folded, the extensions 2a and 2b are bent toward the side of the curtain airbag body 2B opposite the vehicle interior as illustrated in FIG. 11b. The curtain airbag in such a state is folded so as to be long in the front-rear direction and mounted on the roof side of the automobile. The tie panel 3R is positioned next to the rear seat of the automobile. The intersection N is preferably positioned next to a head of an occupant on the rear seat.

The curtain airbag body 2B does not include the circular connected portion 48 and the linearly connected portion 40 extending therefrom, which are included in the curtain airbag bodies 2 and 2A, but includes a single inflation chamber 62 defined by the linearly connected portions 37, 38, and 39 and the portion of the linearly connected portion 30 on the lower side of the curtain airbag. The inflation chamber 62 is in communication with the inflation chamber 60 through the gas passage 22.

Other configurations of the curtain airbag body 2B illustrated in FIG. 11a and FIG. 11b are identical to those of the curtain airbag body 2A illustrated in FIG. 10. The same reference numerals designate the same components.

The inflation operation in the front half of the curtain airbag body 2B illustrated in FIG. 11a and FIG. 11b upon activation of the inflator is the same as that in the curtain airbag body 2A. An inflation operation in the rear half of the curtain airbag body 2B is as follows. Specifically, the gas divided by the duct panel 4 (FIG. 3a) so as to flow rearward inflates the inflation chamber 14 and then inflates the inflation chamber 58. The gas flowing toward the inflation chamber 58 partly flows into the inflation chamber 61 and inflates the inflation chamber 61. The gas passed through the inflation chamber 58 sequentially inflates the inflation chambers 59, 60, and 62.

Figure 12:
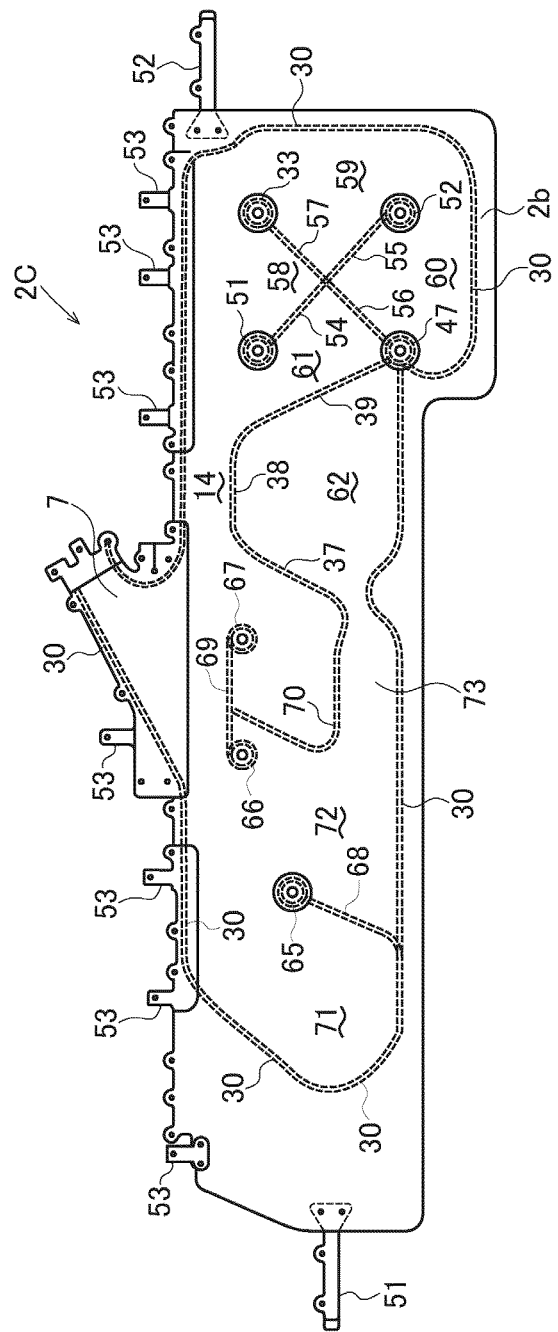
FIG. 12 is a front view of a curtain airbag body of another embodiment.

A curtain airbag body 2C illustrated in FIG. 12 has the pyramidal inflation portion only for the rear seat. The front half does not include the linearly connected portions 32 to 35A, which cross so as to form the X-like shape. Instead, the curtain airbag body 2C includes a linearly connected portion 68 extending upward from the portion of the linearly connected portion 30 on the front lower side of the curtain airbag body 2C, a linearly connected portion 69 extending in the front-rear direction at a position below the inflator inlet 7, and a linearly connected portion 70 extending from the linearly connected portion 69 in an L-like shape. A circular connected portion 65 is disposed on an upper end of the linearly connected portion 68. Circular connected portions 66 and 67 are disposed on ends of the linearly connected portion 69. The linearly connected portion 70 extends downward from a midway position of the linearly connected portion 69 and further extends rearward to the lower end of the linearly connected portion 37.

A space positioned forward of the linearly connected portion 68 is an inflation chamber 71. A space between the linearly connected portions 68 and 70 is an inflation chamber 72. A space between the linearly connected portion 70 and the portion of the linearly connected portion 30 on the lower side of the curtain airbag is an inflation chamber 73. The inflation chamber 73 is in communication with the inflation chamber 62. In this embodiment, the circular connected portion 47, which is positioned at the rear section of the curtain airbag, overlaps the lower linearly connected portion 30, and thus the gas flows into the inflation chamber 62 from the inflation chamber 73, not from the inflation chamber 60.

The front half of the curtain airbag body 2C does not include the extension 2a. Other configurations of the curtain airbag body 2C are identical to those of the curtain airbag body 2B illustrated in FIG. 11a. The same reference numerals designate the same components.

The inflation operation of the inflation chambers 14, 58 to 61 of the curtain airbag body 2C upon activation of the inflator is the same as that of the curtain airbag body 2B. In the front half of the curtain airbag body 2C, the gas from the inflator, which is divided by the duct panel 4 (FIG. 3a), flows forward to inflate the inflation chamber 71. Then, the gas inflates the inflation chambers 72 and 73, and thereafter inflates the inflation chamber 62.

In each of the above-described embodiments, the inflator inlet 7 is positioned near the middle in the front-rear direction on the upper side of the curtain airbag body. However, the inflator inlet 7 may be disposed on the front section or the rear section of the curtain airbag body. Examples of such a configuration are illustrated in FIG. 13 and FIG. 14.

Figure 13:
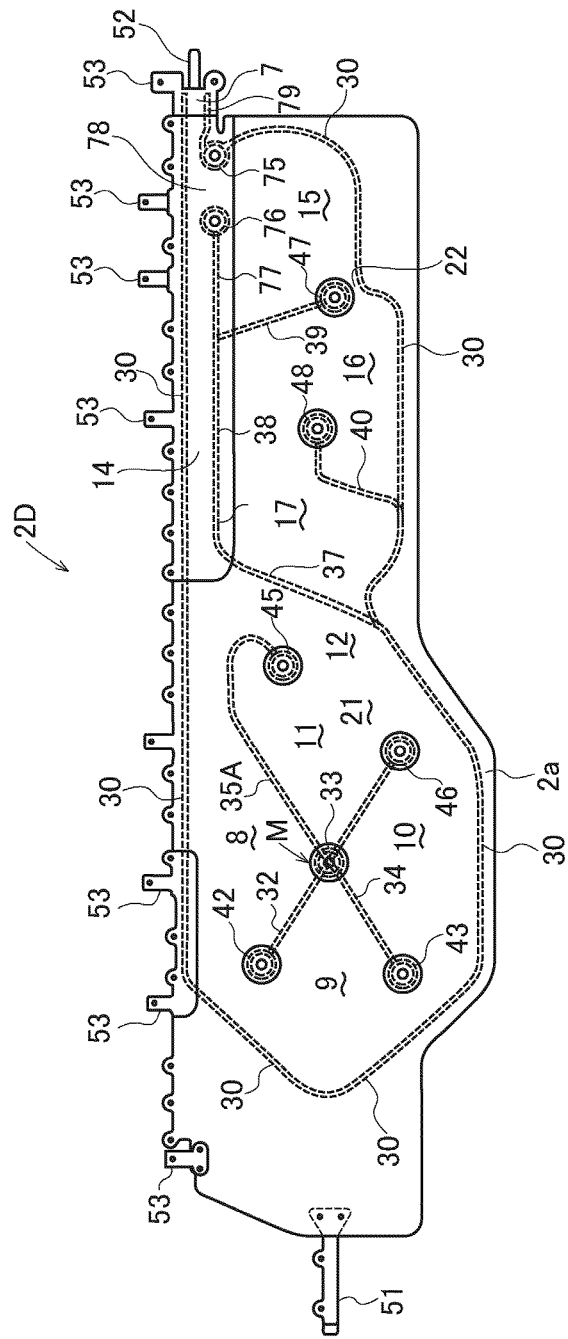
FIG. 13 is a front view of a curtain airbag body of another embodiment.

In a curtain airbag body 2D illustrated in FIG. 13, the inflator inlet 7 is disposed on an upper portion of a rear side of the curtain airbag body 2D. In the curtain airbag body 2D, a linearly connected portion 77 extends rearward from a connection between the linearly connected portion 38 and the linearly connected portion 39. A circular connected portion 76 is disposed on a rear end of the linearly connected portion 77. A circular connected portion 75 is disposed rearward of the circular connected portion 76. A portion of the linearly connected portion 30 on the rear side of the curtain airbag body extends from the circular connected portion 75. A linearly connected portion 79 extends rearward from the circular connected portion 75 along the lower side of the inflator inlet 7. A space between the circular connected portions 76 and 75 is a gas passage 78 through which the gas flows into the inflation chamber 15. Other configurations of the curtain airbag body 2D are identical to those of the curtain airbag body 2A illustrated in FIG. 10 except that the curtain airbag body 2D does not include the circular connected portion 50 at the intersection M. The same reference numerals designate the same components.

The gas from the inflator mounted in the inflator inlet 7 flows through the inflation chamber 14, which is provided between the portion of the linearly connected portion 30 on the upper side of the curtain airbag body 2D and each of the linearly connected portions 77 and 38, to the front half of the curtain airbag body 2D so as to inflate the inflation chambers 8 to 12 in a pyramidal shape. The gas from the inflator partly flows into the inflation chamber 15 through the gas passage 78 to sequentially inflate the inflation chambers 15, 16, and 17.

Figure 14:
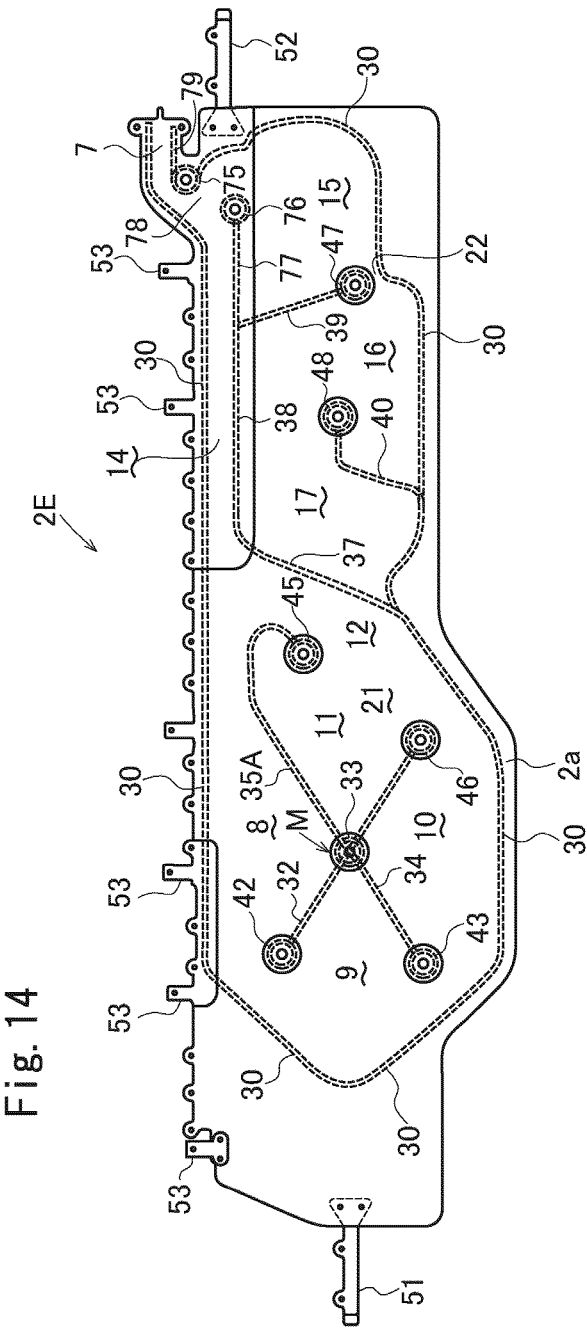
FIG. 14 is a front view of a curtain airbag body of another embodiment.

In a curtain airbag body 2E illustrated in FIG. 14, the inflator inlet 7 is disposed on a rear end of the upper side of the curtain airbag body 2E. In the curtain airbag body 2E, the circular connected portion 75 is positioned obliquely upward and rearward of the circular connected portion 76. The inflator inlet may be positioned forward of the position illustrated in FIG. 14.

Other configurations of the curtain airbag body 2E are identical to those of the curtain airbag body 2D illustrated in FIG. 13. The same reference numerals designate the same components. In addition, the inflation operation of the curtain airbag body 2E upon activation of the inflator is the same as that of the curtain airbag body 2D.

The curtain airbag of the present invention, particularly the curtain airbag 1 illustrated in FIGS. 1 to 7 is suitable for restraining an occupant on the driver's seat upon a small overlap collision (narrow offset collision). Specifically, as illustrated in FIG. 15a, the curtain airbag 1 and a driver's seat airbag 90 are inflated upon a small overlap collision to restrain the occupant on the driver's seat. In such a case, the front half of the curtain airbag 1 inflated in a pyramidal shape applies a reactive force to an occupant's head H. In addition, since the inflation chamber 13, which increases largely in thickness when inflated, is positioned at the forefront section of the curtain airbag 1, the driver's head H is guided toward the driver's seat airbag 90 as illustrated in FIG. 15b and FIG. 15c, not toward an A pillar 91, and is restrained by the driver's seat airbag 90 in the end.

In the above-described embodiments, the linearly connected portions extend radially in four directions such that the occupant restraining portion in the pyramidal shape is formed. However, the linearly connected portions may extend radially in three directions or five or more directions. In addition, in the above-described embodiments, the inflation chambers are formed between every four radial linearly connected portions. However, some of them may be composed of a non-inflation panel instead of the inflation chamber.

The above-described embodiments are examples of the present invention, and the present invention is not limited to the above-described embodiments.

This application claims priority to Japanese Patent Application No. 2013-219277 filed on 22 Oct. 2013, the whole content of this application being incorporated herein by reference.

REFERENCE SIGNS LIST 1 curtain airbag
2, 2A to 2E curtain airbag body
3, 3R tie panel
3b upper connecting mean
3c lower connecting mean
4 duct panel
5 first panel
6 second panel
7 inflator inlet
8 to 17, 58 to 62, 71 to 73 inflation chamber
20 to 22, 78 gas passage
30 to 40, 54 to 57, 70, 77, 79 linearly connected portion
41 to 48, 51 to 53, 66 to 67, 75, 76 circular connected portion

The invention claimed is:

1. A curtain airbag configured to deploy downward along a side surface of a vehicle interior, comprising:
    a curtain airbag body configured to be inflated with gas from an inflator; and
    a tie panel disposed on a side surface of an intermediate portion of the curtain airbag body in a front-rear direction of a vehicle (hereinafter, referred to as a tie panel installation portion) on a side opposite the vehicle interior, the tie panel being connected to an upper portion and a lower portion of the curtain airbag body with an upper connection means and a lower connection means,
    the curtain airbag body including: a first panel on a vehicle interior side; a second panel on a side opposite the vehicle interior side; and a connected portion connecting the first panel and the second panel to each other,
    the connected portion including: a peripheral connected portion extending along peripheral portions of the first panel and the second panel; and an inner connected portion positioned inward from the peripheral connected portion,
    a length between the upper connection means and the lower connection means in the tie panel being shorter than a length between the upper connection means and the lower connection means in the curtain airbag body, wherein
    the inner connected portion includes radial connected portions extending radially in three directions or in more than three directions from a middle or from a position near the middle of the tie panel installation portion, and
    the radial connected portions extending in the three directions extend at least obliquely upward or obliquely downward from the middle or from the position near the middle of the tie panel installation portion, wherein the radial connected portions extending from the middle or from the position near the middle of the tie panel installation portion include a first radial connected portion extending forward and upward, a second radial connected portion extending forward and downward, a third radial connected portion extending rearward and downward, and a fourth radial connected portion extending rearward and upward.

2. The curtain airbag according to claim 1, wherein the first radial connected portion and the third radial connected portion extend in opposite directions, and the second radial connected portion and the fourth radial connected portion extend in opposite directions.

3. The curtain airbag according to claim 2, wherein the inner connected portion includes a circular connected portion extending circularly at the middle or at the position near the middle of the tie panel installation portion, and the first to fourth radial connected portions extend radially from the circular connected portion.

4. The curtain airbag according to claim 1, wherein a space between the radial connected portions in the curtain airbag body is configured to be inflated with gas from an inflator.

5. The curtain airbag according to claim 1, wherein a length in a vertical direction of the curtain airbag body at the tie panel installation portion is longer than a length in the vertical direction of the curtain airbag body at sections on front and rear sides of the tie panel installation portion.

6. The curtain airbag according to claim 1, wherein the tie panel includes a ventilation hole.

7. The curtain airbag according to claim 1, wherein the tie panel is positioned next to at least one of a front seat and a rear seat of an automobile.

8. The curtain airbag according to claim 1, wherein the tie panel is positioned next to a front seat of an automobile.

9. A curtain airbag device comprising:
   the curtain airbag according to claim 1; and
   an inflator configured to inflate the curtain airbag.

* * * * *